United States Patent
Whitwell

(10) Patent No.: US 10,218,469 B2
(45) Date of Patent: Feb. 26, 2019

(54) UNIFIED FORWARD ERROR CORRECTION AND RETRANSMISSION IN A RELIABLE NETWORK PROTOCOL

(71) Applicant: VMware, Inc., Palo Alto, CA (US)

(72) Inventor: Keith Whitwell, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 70 days.

(21) Appl. No.: 15/373,357

(22) Filed: Dec. 8, 2016

(65) Prior Publication Data

US 2018/0167162 A1 Jun. 14, 2018

(51) Int. Cl.
| | | |
|---|---|---|
| *H04L 1/00* | (2006.01) | |
| *H04L 1/20* | (2006.01) | |
| *H04L 12/26* | (2006.01) | |
| *H04L 1/18* | (2006.01) | |

(52) U.S. Cl.
CPC .............. *H04L 1/20* (2013.01); *H04L 1/1867* (2013.01); *H04L 43/0835* (2013.01); *H04L 43/0847* (2013.01)

(58) Field of Classification Search
CPC ..... H04L 1/20; H04L 1/0002; H04L 43/0835; H04L 43/0847
See application file for complete search history.

(56) References Cited

U.S. PATENT DOCUMENTS

| | | | | |
|---|---|---|---|---|
| 2010/0195488 | A1* | 8/2010 | Mehrotra | H04L 1/0002 370/216 |
| 2011/0219287 | A1* | 9/2011 | Srinivas | G06F 11/10 714/781 |
| 2012/0063493 | A1* | 3/2012 | Hasegawa | H04L 47/263 375/211 |
| 2013/0279338 | A1* | 10/2013 | Mehrotra | H04L 47/30 370/235 |

OTHER PUBLICATIONS

Cardwell, et al. "BBR: Congestion-Based Congestion Control Measuring bottleneck bandwidth and round-trip propagation time", ACM Queue, vol. 14 No. 5—Sep./Oct. 2016, pp. 1-34. <http://queue.acm.org/detail.cfm?id=3022184>.
"Transmission Control Protocol" Wikipedia, Nov. 25, 2016, pp. 1-18. <https://en.wikipedia.org/wiki/Transmission_Control_Protocol>.

* cited by examiner

*Primary Examiner* — Thien Nguyen
(74) *Attorney, Agent, or Firm* — Patterson + Sheridan, LLP

(57) ABSTRACT

A method of transmitting packets at a first node of a network to a second node of the network, includes the steps of determining whether or not a total number of packets that are in flight is less a threshold number of packets, computing a target number of forward error correction (FEC) packets upon determining that the total number is less than the threshold number, transmitting a new FEC packet if the number of FEC packets that are in flight is less than the target number, and transmitting a data packet if the number of FEC packets that are in flight is equal to or greater than the target number.

20 Claims, 7 Drawing Sheets t0: Begin packet transmission for Datagram X
packetSeq = RN1 (assume 1000); dataSeq = RN2 (assume 100); dgram = X t1: 4 data packets in flight

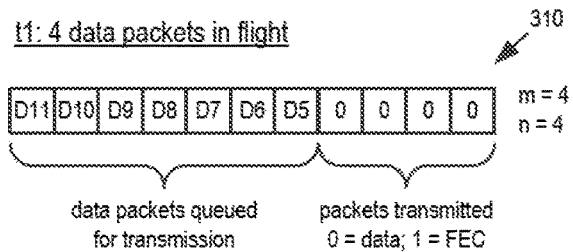

t2: new FEC packet transmitted (packetSeq = 1004; dataSeq = 100; segCount = 4)

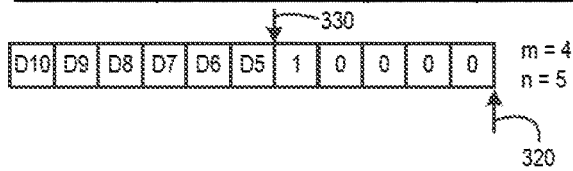

t3: new FEC packet transmitted (packetSeq = 1005; dataSeq = 100; segCount = 4)

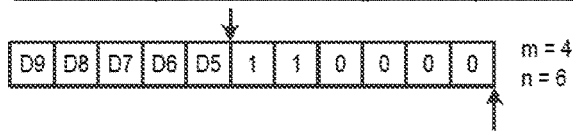

t4: new data packet transmitted (packetSeq = 1006; dataSeq = 104; segCount = 1)

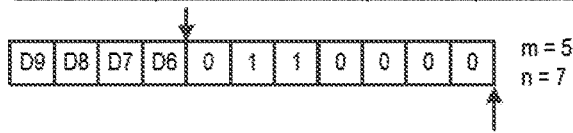

t5: ACK received (ackSeq = 100, rowCount = 0)

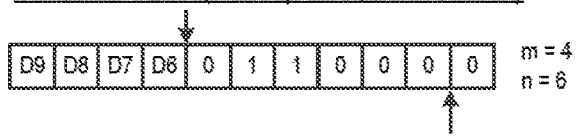

t6: new FEC packet transmitted (packetSeq = 1007; dataSeq = 101; segCount = 4)

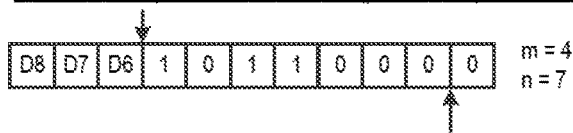

FIGURE 3A t7: new data packet transmitted (packetSeq = 1008; dataSeq = 105; segCount = 1)

t8: ACK received (ackSeq = 101; rowCount = 0)

t9: new data packet transmitted (packetSeq = 1009; dataSeq = 106; segCount = 1)

t10: ACK received (ackSeq = 101; rowCount = 1)

t11: ACK received (ackSeq = 103; rowCount = 0)

r0: Receive D1 data packet (packetSeq = 1000; dataSeq = 100; segCount =1)

r1: Receive D2 data packet (packetSeq = 1001; dataSeq = 101; segCount =1)

r2: Receive D4 data packet (packetSeq = 1003; dataSeq = 103; segCount =1)

r3a: Receive FEC data packet (packetSeq = 1004; dataSeq = 100; segCount =4) and decode D3 r3b: Receive FEC data packet (packetSeq = 1004; dataSeq = 101; segCount =3) and decode D3

UNIFIED FORWARD ERROR CORRECTION AND RETRANSMISSION IN A RELIABLE NETWORK PROTOCOL

BACKGROUND

TCP (Transmission Control Protocol) and similar network protocols provide reliable transmission of data between nodes separated by an unreliable network which may drop, corrupt or reorder in-flight packets. Such protocols typically rely on retransmission of missing data packets to provide reliable delivery. Retransmission has a latency drawback as it is necessary to inform the sender which packets require retransmission, which imposes a round-trip-time delay in packet delivery which may be visible to the application. For interactive services on networks with a high probability of packet loss, these delays impact the usability of the service.

There have been attempts to apply forward error correction (FEC) techniques to overcome packet loss in the network. According to such techniques, the sender transmits a predefined number of data packets, commonly referred to as an FEC epoch, and follows that up with transmission of one or more FEC packets that the receiver can use to repair instances of data packet loss. While helpful in some circumstances, this technique cannot guarantee reliable delivery on its own, e.g., when the number of dropped data packets is greater than the number of FEC packets.

There have been attempts to build protocols with both techniques operating simultaneously, transmitting FEC packets and also applying traditional retransmission to correct any packets that could not be repaired by FEC. However, current solutions to combine the two approaches have added too much complexity or have not led to significant improvements in the transmission latency.

SUMMARY

Embodiments provide a unified forward error correction and retransmission technique that can be applied to transport layer protocols. According to this technique, the FEC epoch is replaced with a sliding FEC window, the size of which is defined dynamically by the number of data packets that are in-flight (transmitted but not yet acknowledged). The size of this sliding FEC window is adjusted up and down according to network conditions. In addition, the determination of when an FEC packet should be transmitted is made dynamically according to the network conditions, the number of in-flight data packets, and the number of in-flight FEC packets.

According to one embodiment, a method of transmitting packets at a first node of a network (e.g., sender node) to a second node of the network (e.g., receiver node), includes the steps of determining whether or not a total number of packets that are in flight is less a threshold number of packets, computing a target number of FEC packets upon determining that the total number is less than the threshold number, transmitting a new FEC packet if the number of FEC packets that are in flight is less than the target number, and transmitting a data packet if the number of FEC packets that are in flight is equal to or greater than the target number.

Further embodiments of the present invention include a computer system configured to carry out the above method, and non-transitory computer-readable medium comprising instructions that cause the computer system to carry out the above method.

BRIEF DESCRIPTION OF THE DRAWINGS

FIGS. 3A and 3B depict packet transmission from a sender node at different points in time.

DETAILED DESCRIPTION

Figures 1, 2:
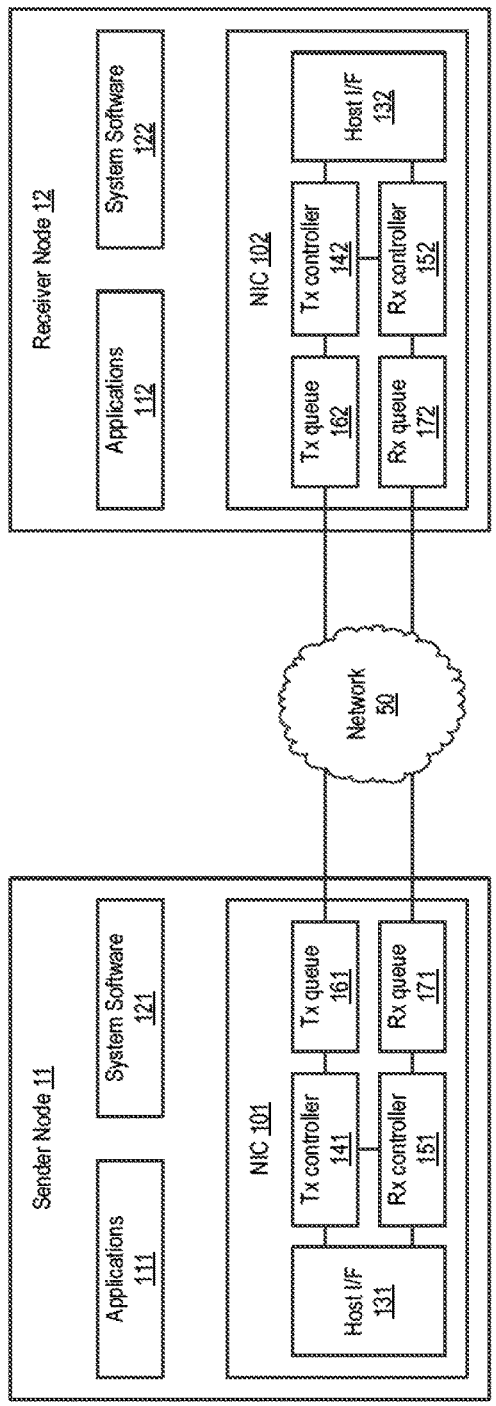
FIG. 1 depicts two nodes of a network between which packets are transmitted according to embodiments.
FIG. 2 depicts information contained in a header of packets prepared according to embodiments.

FIG. 1 depicts two nodes of a network between which packets are transmitted according to embodiments. The two nodes are depicted as a sender node 11 and a receiver node 12, but it should be understood that packets may be transmitted by receiver node 12 and received by sender node 11 because communication between any two nodes of the network is bi-directional. In fact, acknowledgements are encapsulated as packets for transmission by receiver node 12 and reception by sender node 11.

Sender node 11 and receiver node 12 are each a computing device that is connected to a network 50 through a network interface controller (NIC) and has conventional computer hardware in addition to the NIC, such as one or more processors, system memory, and a hardware interface to storage devices. In sender node 11, system software 121 provides applications 111 running therein a software interface to hardware such as NIC 101. Similarly, in receiver node 12, system software 122 provides applications 112 running therein a software interface to the hardware such as NIC 102. In one embodiment, applications 111 and 112 are virtual machines or more generally virtual computing instances, and system software 121 and 122 is a virtualization software layer, e.g., a hypervisor, that supports the execution of the virtual computing instances.

NIC 101 and NIC 102 employ a transport layer protocol according to embodiments to communicate with each other over network 50. When applications 111 of sender node 11 generate data to be sent to applications 112 of receiver node 12, such data are transmitted to host interface 131. Upon detecting that data have been received from applications 111 by host interface 131, transmit controller (Tx controller) 141 prepares data packets and places them in transmit queue (Tx queue) 161 for transmission to receiver node 12 over network 50. In addition, as needed, Tx controller 141 prepares FEC packets, which are used in reconstructing dropped data packets, and places them in Tx queue 161 for transmission.

When the packets transmitted by sender node 11 arrive at receiver node 12, they are placed into a receive queue (Rx queue) 172 of NIC 102. Upon detecting that packets have been placed into Rx queue 172, receive controller (Rx controller) 152 extracts the data of data packets and transmits them to applications 112 through host interface 132. Rx controller 152 also performs a decoding process which involves reconstructing of dropped data packets using one or more of the FEC packets and successfully received data packets.

Also at receiver node 12, Tx controller 142 of NIC 102 prepares acknowledgement (ACK) packets and places them in Tx queue 162 for transmission to sender node 11. When the ACK packets transmitted by receiver node 12 arrive at sender node 11, they are placed into an Rx queue 171 of NIC 101. Upon detecting that ACK packets have been received into Rx queue 171, Rx controller 151 examines the contents of the ACK packets to update variables that are used in the subsequent transmission of packets to receiver node 12.

FIG. 2 depicts information contained in the header of each packet prepared according to embodiments. Each of data, FEC, and ACK packets discussed above employ the same header format. The header fields depicted in FIG. 2 are a subset of all header fields and have been selected because they contain information that are useful in explaining the examples of FIGS. 3A, 3B, and 4 and the methods of FIGS. 5, 6, and 7.

The payload of a data packet contains data passed by the applications to the NIC for transmission. The payload of an FEC packet contains data that have been encoded by a linear combination of multiple data packets that are in flight (more precisely, a linear combination under suitable finite field arithmetic, examples of which are the Galois fields GF(2) and GF(256)) and cannot be decoded except through the FEC process. The ACK packet consists of just the packet header.

The packetSeq field contains the packet number. The dataSeq field contains the sequence number for a data packet. The Tx controller randomly generates the initial packet number and the initial sequence number at the beginning of a transmission period for a datagram. The label or identifier of a datagram is inserted into the dgram field.

When a data packet is prepared for transmission, Tx controller 141 places the packet number in the packetSeq field, the sequence number of the data packet in the dataSeq field, and increments the packet number and the sequence number. Tx controller 141 also inserts a "1" in the segCount field to indicate that the packet is a data packet. By contrast, ACK packets have a "0" in the segCount field and FEC packets have a value greater than 1 in the segCount field. This value indicates the number of data packets that are encoded in the FEC packet.

When an FEC packet is prepared for transmission, Tx controller 141 places the packet number in the packetSeq field, and increments the packet number. Tx controller 141 also places the lowest sequence number among the data packets encoded in the FEC packet in the dataSeq field, and inserts a value indicating the number of data packets that are encoded in the FEC packet in the segCount field. With the information in the dataSeq field and the segCount field, receiver node 12 will understand which data packets can be reconstructed with the FEC packet.

The payload of each FEC packet is a linear combination of data packets encoded therein using FEC coefficients that are generated with a random number generator seeded with the packet number. At receiver node 12, a random number generator employing the same algorithm as at sender node 11 is employed and also seeded with the packet number so that the same FEC coefficients can be generated for use in the decoding process. The number of FEC coefficients that are generated is equal to the number of data packets that are encoded in the FEC packet.

Receiver node 12 cumulatively acknowledges data packets. In particular, upon receipt of the data packet, receiver node 12 returns an ACK packet that contains the following information:

ackSeq—the highest sequence number among a contiguous sequence of data packets that receiver node 12 was able to decode;

rowCount—the number of data packets that have been received but cannot be acknowledged because a data packet having a lower sequence number has not yet been decoded;

packetAck—the highest packet number among the packets, both data packets and FEC packets, received by receiver node 12; and packetTotal—the running total of all packets actually received by receiver node 12.

Figure 3B:
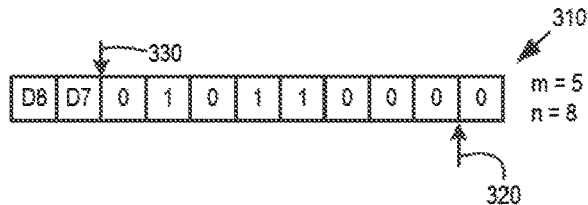
Figure 3B:
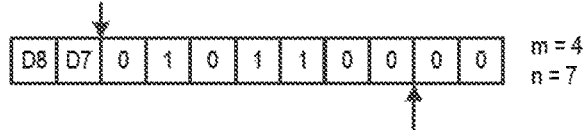
Figure 3B:
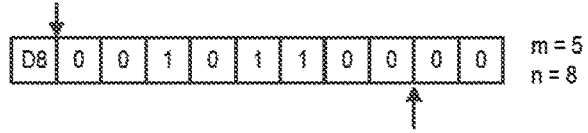
Figure 3B:
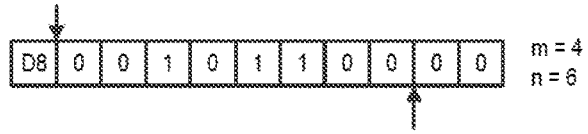
Figure 3B:
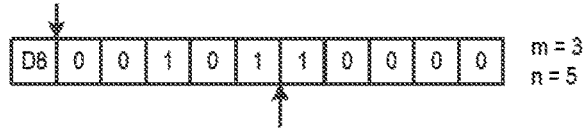

FIGS. 3A and 3B depict packet transmission from Tx queue 161 at different points in time. Time t0 represents the beginning of packet transmission for datagram having the ID of X. Times t1-t11 are successively subsequent points in time at which a data packet is generated and transmitted, or an FEC packet is generated and transmitted, or an ACK packet is received. As will be described in conjunction with FIG. 5, the next packet transmission is determined based on the number of packets that are in flight. If this number is less than the size of the congestion window, CWND, a transmission of an additional packet is allowed. Also, a decision is made between data packet transmission and FEC packet transmission based on an estimation of how many FEC packets should be sent in view of the likelihood of data packet loss. On the other hand, the receipt of an acknowledgement packet is an asynchronous event, and thus for illustrative purposes, it is assumed in the example given in FIGS. 3A and 3B, that four ACK packets are received during times t0-t11.

At each point in time, a conceptual queue 310 of packets transmitted and to be transmitted is illustrated along with arrow 320 that depicts what packets have been acknowledged as received and arrow 330 that depicts what data packets are waiting for transmission. In addition, the changes in the packet header values for different packets are shown, as well as the changes in the values for m and n.

The value m represents all data packets that have been transmitted and not acknowledged, and is computed as dataSeq—(ackSeq+rowCount), where dataSeq is the sequence number for the most recent data packet transmitted. At any point in time, the value m represents the number of data packets that are in-flight and thus could be dropped in route to receiver node 12. It should be recognized that, in the embodiments, this value is decreased as ACK packets for data packets are received and increased as additional data packets are transmitted, and is thus not fixed to a predefined value. The value n represents all packets, counting both data packets and FEC packets, that have been transmitted and not acknowledged. The value n is computed as packetSeq—packetAck, where packetSeq is the packet number for the most recent data packet or FEC packet transmitted, and packetAck is the highest packet number among the packets, both data packets and FEC packets, that have been acknowledged as being received.

Time t0 represents the beginning of packet transmission for datagram X. At this time, the initial values for packetSeq and dataSeq are determined randomly. For ease of illustration, in the example given in FIGS. 3A, 3B, and 4, it is assumed that this value is 1000 for packetSeq and 100 for dataSeq.

At time t1, it is assumed that four data packets have been transmitted and not acknowledged and no FEC packets have been transmitted, so m=4 and n=4.

At time t2, it is assumed that Tx controller 141 determined that a new FEC packet should be prepared and transmitted, and that the new FEC packet is prepared and transmitted, so n=5 and m=4. Queue 310 shows the new FEC packet being inserted. The dataSeq value of 100 indicates that the first of the data packets encoded in the FEC packet has a dataSeq value of 100, and the segCount value of 4 indicates how many (in this case, four) data packets are encoded in the FEC packet. Thus, this FEC packet is encoded with the contents of the 4 data packets beginning with the data packet having a dataSeq value of 100, and coefficients c1, c2, c3, and c4 that are generated using a random number generator with a seed equal to the FEC packet number (1004).

At time t3, it is assumed that Tx controller 141 determined that another new FEC packet should be prepared and transmitted, and that the new FEC packet is prepared and transmitted, so n=6 and m=4. Queue 310 shows the new FEC packet being inserted. The dataSeq value and the segCount value are the same as the previous FEC packet because the first data packet in the group of encoded data packets did not change and the number of data packets encoded in this FEC packet also did not change. Thus, this FEC packet is encoded with the contents of the 4 data packets beginning with the data packet having a dataSeq value of 100, and coefficients c5, c6, c7, and c8 that are generated using a random number generator with a seed equal to the FEC packet number (1005).

At time t4, it is assumed that Tx controller 141 determined that a new data packet should be prepared and transmitted, and that data packet D5 is prepared and transmitted, so n=7 and m=5. Queue 310 shows the new data packet (0) being inserted to the right of arrow 330.

At time t5, it is assumed that an ACK packet is received and in the header of the ACK packet, ackSeq=100 and rowCount=0. As a consequence, both the n and m values are decremented by one. In addition, the data packet having the dataSeq=100 no longer requires any decoding (because the ACK packet indicates successful decoding of all sequence numbers equal to or less than the ackSeq value).

At time t6, it is assumed that Tx controller 141 determined that another new FEC packet should be prepared and transmitted, and that the new FEC packet is prepared and transmitted, so n=7 and m=4. The new FEC packet prepared at step t6 is however different from the new FEC packets prepared at times t2 and t3 because the dataSeq value is 101 instead of 100, indicating that the first of the data packets encoded in the FEC packet has a dataSeq value of 101. Thus, this FEC packet is encoded with the contents of the 4 data packets beginning with the data packet having a dataSeq value of 101, and coefficients c9, c10, c11, and c12 that are generated using a random number generator with a seed equal to the FEC packet number (1007).

At time t7, it is assumed that Tx controller 141 determined that a new data packet should be prepared and transmitted, and that data packet D6 is prepared and transmitted, so n=8 and m=5. Queue 310 shows the new data packet (0) being inserted to the right of arrow 330.

At time t8, it is assumed that an ACK packet is received and in the header of the ACK packet, ackSeq=101 and rowCount=0. As a consequence, both the n and m values are decremented by one.

At time t9, it is assumed that Tx controller 141 determined that a new data packet should be prepared and transmitted, and that data packet D7 is prepared and transmitted, so n=8 and m=5. Queue 310 shows the new data packet (0) being inserted to the right of arrow 330.

At time t10, it is assumed that an ACK packet is received and in the header of the ACK packet, ackSeq=101 and rowCount=1. The repeated ackSeq=101 indicates that the data packet having dataSeq=102 has been dropped and rowCount=1 indicates that one data packet having a dataSeq >102 has been received but cannot be acknowledged as having been received because of a dropped packet that has a lower dataSeq number. The value m is decreased by one as a result of rowCount=1. In addition, it is assumed that in the header of the ACK packet, packetAck=1003, and so n=6.

At time t11, it is assumed that an ACK packet is received and in the header of the ACK packet, ackSeq=103 and rowCount=0. The increase in the ackSeq and the decrease in rowCount indicate that any dropped packet has been reconstructed through the decoding process at receiver node 12. At this point, n=5 and m=3.

Figure 4:
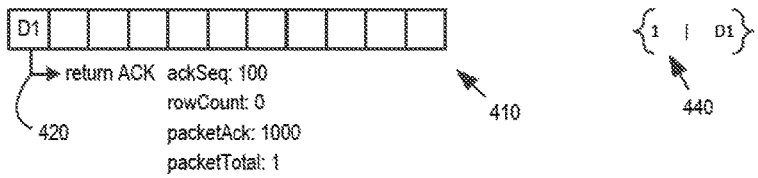
FIG. 4 depicts packet reception by a receiver node at different point of time and the generation of acknowledgement packets in response thereto.
Figure 4:
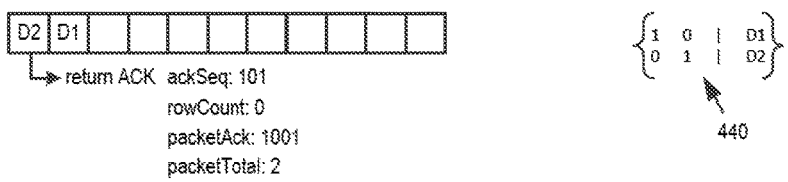
Figure 4:
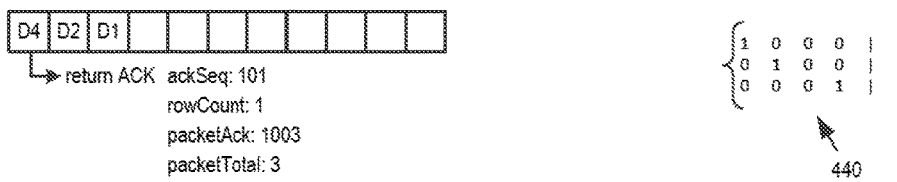
Figure 4:
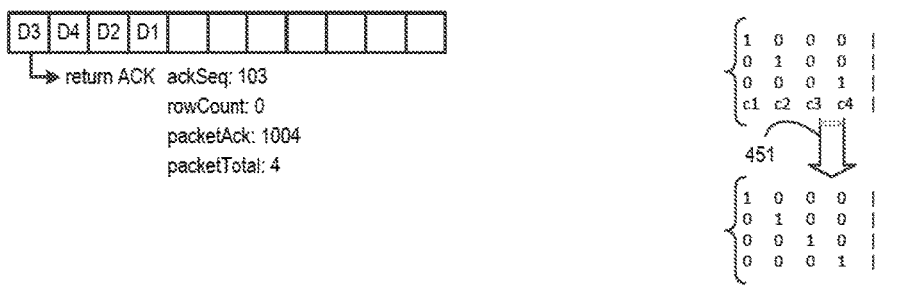
Figure 4:
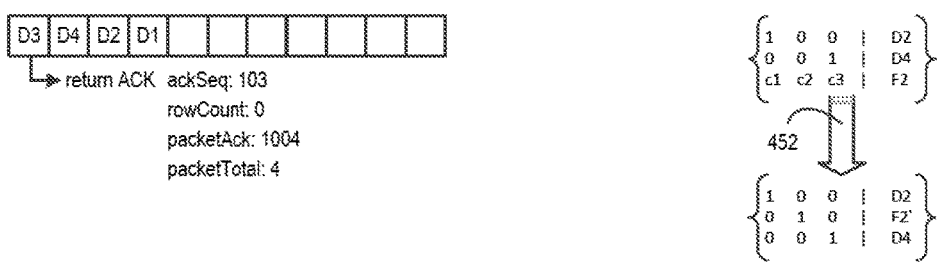

FIG. 4 depicts packet reception into Rx queue 172 at different point of time and the generation of ACK packets in response thereto. At each point in time, a conceptual queue 410 of received data packets is illustrated along with arrow 420 that represents the generation of an ACK packet containing the header value as shown. In addition, a matrix 440 for performing the decoding process is shown to illustrate how matrix 440 changes as packets are received and data packets decoded. A packet that is received is represented by a new row in matrix 440. A data packet that is received is represented by a 1 in the corresponding column and 0's elsewhere in that row. An FEC packet that is received is represented in that row by coefficients which are regenerated at receiver node 12 using a random number generator employing the same algorithm as at sender node 11 with a seed equal to the packet number of the corresponding FEC packet. A data packet that is deemed dropped because a data packet having a higher dataSeq number has been received, has zeroes in its corresponding column, and is decoded using one or more FEC packets and the coefficients thereof. Each row in matrix 440 is augmented with the contents of the packet received (either data or FEC). The decoding process consists of Gaussian elimination to transform rows which originated as FEC packets (with multiple non-zero columns) into rows with a single one on the diagonal. The row operations of Gaussian elimination are performed on both the matrix coefficients and the augmented packet data.

Time r0 represents the beginning of packet reception for datagram having the ID of X. Times r1-r3 are each subsequent points in time at which a data packet or an FEC packet is received and ACK packet is generated and transmitted. At time r0, it is assumed that the packet having dataSeq=100 and segCount=1 has arrived at receiver node 12. Because the segCount=1, this packet is determined to be a data packet and an ACK packet is prepared with ackSeq=100, and then transmitted to sender node 11. In the ACK packet, rowCount=0 because there is no received data packet that cannot be acknowledged because of a deemed dropped data packet. In addition, packetAck=1000 to indicate the highest packet number of a packet received up to time r0 and packetTotal=1 (assuming for ease of illustration that the packetTotal value begins incrementing up from an initial value of 0) to indicate that one packet has been received since packet reception began for datagram having the ID of X. Matrix 440 has a single row upon receipt of the first data packet.

At time r1, it is assumed that that the packet having dataSeq=101 and segCount=1 has arrived at receiver node 12. Because the segCount=1, this packet is determined to be a data packet and an ACK packet is prepared with ackSeq=101, and then transmitted to sender node 11. In the ACK packet, rowCount=0 because there is no received data packet that cannot be acknowledged because of a deemed dropped data packet. In addition, packetAck=1001 to indicate the highest packet number of a packet received up to time r1 and packetTotal=2 to indicate that two packets have been received since packet reception began for datagram having the ID of X. Matrix 440 has two rows with a 1 in the columns corresponding to the received data packets and 0's elsewhere.

At time r2, it is assumed that that the packet having dataSeq=103 and segCount=1 has arrived at receiver node 12. Because the segCount=1, this packet is also determined to be a data packet. However, a data packet having dataSeq=102 has not yet been received and so an ACK packet is prepared with ackSeq=101 (not ackSeq=103) and with rowCount=1. On the other hand, packetAck=1003 to indicate the highest packet number of a packet received up to time r2 (regardless of whether or not packet having packetSeq=1002 has been received) and packetTotal=3 to indicate that three packets have been received since packet reception began. Matrix 440 now has three rows and four columns with a 1 in the columns corresponding to each of the three received data packets and 0's elsewhere, including the column corresponding to the deemed lost data packet.

In the example of FIG. 4, either time r3a or time r3b follows time r2. At time r3a, it is assumed that that the packet having dataSeq=100 and segCount=4 has arrived at receiver node 12. Because the segCount=4, this packet is determined to be an FEC packet. Upon receipt of this packet, matrix 440 is increased by one row to add coefficients c1, c2, c3, and c4 that are generated using a random number generator employing the same algorithm as at sender node 11 with a seed equal to the packet number (1004). The missing data packet having dataSeq=102 can be decoded using matrix 440. During the decoding, matrix 440 is transformed through Gaussian elimination (depicted by block arrow 451) to have 1's in the diagonal and 0's elsewhere. After the decoding process, the ACK packet is prepared with ackSeq=103, and then transmitted to sender node 11. Also, in the ACK packet, rowCount=0 because all received data packets have now been acknowledged. In addition, packetAck=1004 to indicate the highest packet number of a packet received up to time r3 and packetTotal=4 to indicate that four packets have been received since packet reception began.

At time r3b, it is assumed that that the packet having dataSeq=101 and segCount=3 has arrived at receiver node 12. Because the segCount=3, this packet is determined to be an FEC packet. The dataSeq value of 101 indicates that the row (top row) and column (first column) corresponding to the data packet having dataSeq=100 can be removed from matrix 440. Then, matrix 440 is increased by one row to add coefficients c1, c2, and c3 that are generated using a random number generator employing the same algorithm as at sender node 11 with a seed equal to the packet number (1004). The missing data packet having dataSeq=102 can be decoded using matrix 440. During the decoding, matrix 440 is transformed through Gaussian elimination (depicted by block arrow 452) to have 1's in the diagonal and 0's elsewhere. After the decoding process, the ACK packet is prepared with ackSeq=103, and then transmitted to sender node 11. Also, in the ACK packet, rowCount=0 because all received data packets have now been acknowledged. In addition, packetAck=1004 to indicate the highest packet number of a packet received up to time r3 and packetTotal=4 to indicate that four packets have been received since packet reception began.

Figure 5:
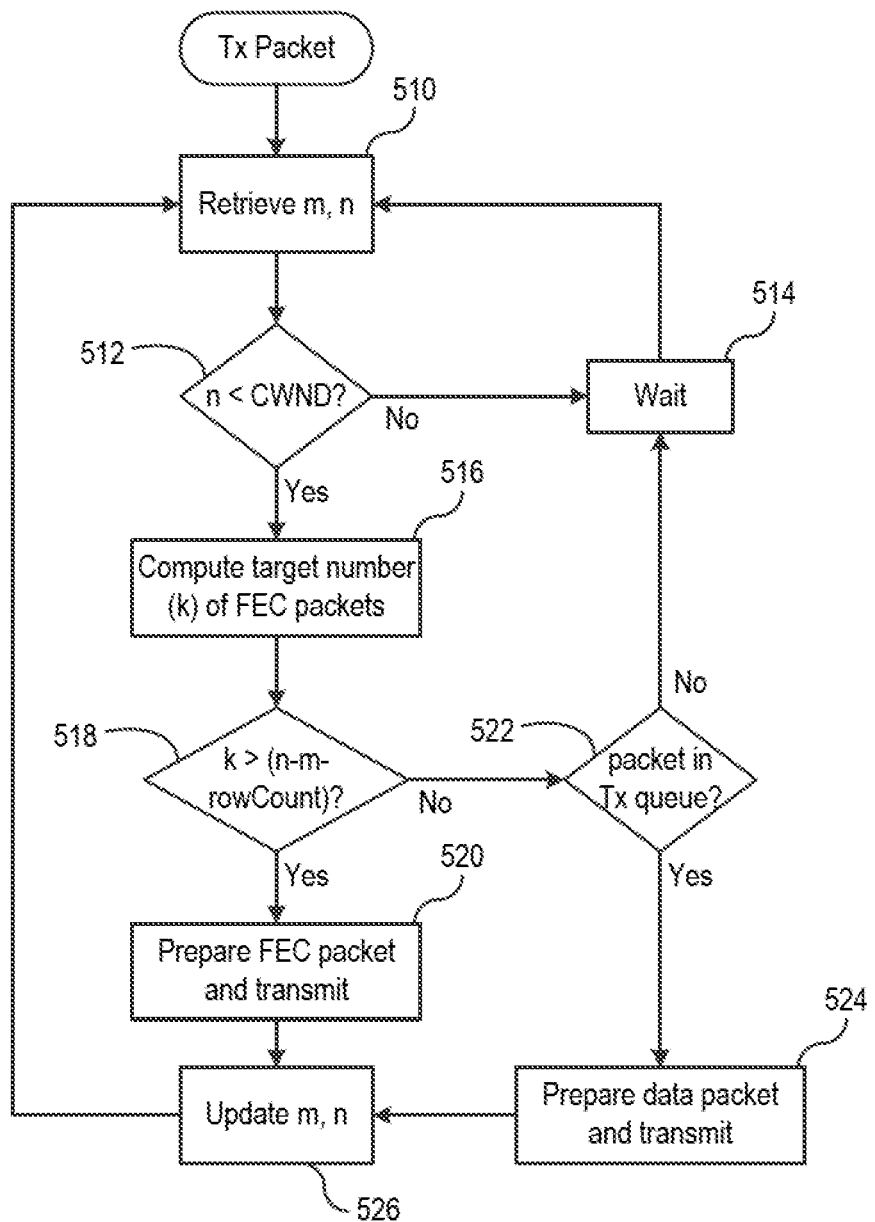
FIG. 5 is a flow diagram of a process carried out by the sender node when transmitting a packet to the receiver node.

FIG. 5 is a flow diagram of a process carried out by Tx controller 141 of sender node 11 for transmitting either a data packet or an FEC packet to receiver node 12. The process is triggered when an application 111 sends data for transmission to NIC 101 and Tx controller 141 encapsulates the data into a packet and places it in Tx queue 161. Then, at step 510, Tx controller 141 retrieves the current (stored) values of m and n. The value of m represents the number of data packets that are in flight and the value of n represents the number of all packets that are in flight.

At step 512, Tx controller 141 compares the value n against the size of the congestion window, CWND, which, as further described below in conjunction with FIG. 6, may be increased or decreased dynamically and programmatically as transmitted packets are being acknowledged. If n is not less than CWND, Tx controller 141 does not permit the transmission of a new packet at that point in time. Thus, at step 514, Tx controller 141 waits for a period of time with the expectation that the size of n will decrease as one or more packets in flight to sender node 12 are received and acknowledged by sender node 12 during the waiting period.

If n is less than CWND, Tx controller 141 at step 512 determines a target number (k) of FEC packets that should be transmitted in view of the estimated probability of losing packets in route to sender node 12 and the total number of packets in route to sender node 12. For example, if the packet loss rate is 1 out of 5 and n=10, target number k is determined to be 2.

At step 518, Tx controller 141 compares the target number k to the actual number of FEC packets in route to sender node 12. The actual number of FEC packets is (n-m-rowCount). If the target number of FEC packets is greater than the actual number of FEC packets, Tx controller 141 at step 520 prepares a new FEC packet as described above in the examples of FIGS. 3A and 3B and transmits the new FEC packet to receiver node 12.

On the other hand, if the target number of FEC packets is not greater than the actual number of FEC packets, Tx controller 141 at step 522 determines if there is a data packet in Tx queue 161. If there is none, the waiting at step 514 is carried out before returning to step 510. If there is a data packet in Tx queue 161, Tx controller 141 at step 524 prepares a new data packet as described above in the examples of FIGS. 3A and 3B and transmits the new data packet to receiver node 12.

After packet transmission at steps 520 and 524, Tx controller 141 at step 526 updates the values of m and n, and returns to step 510 to repeat the process described above.

Figure 6:
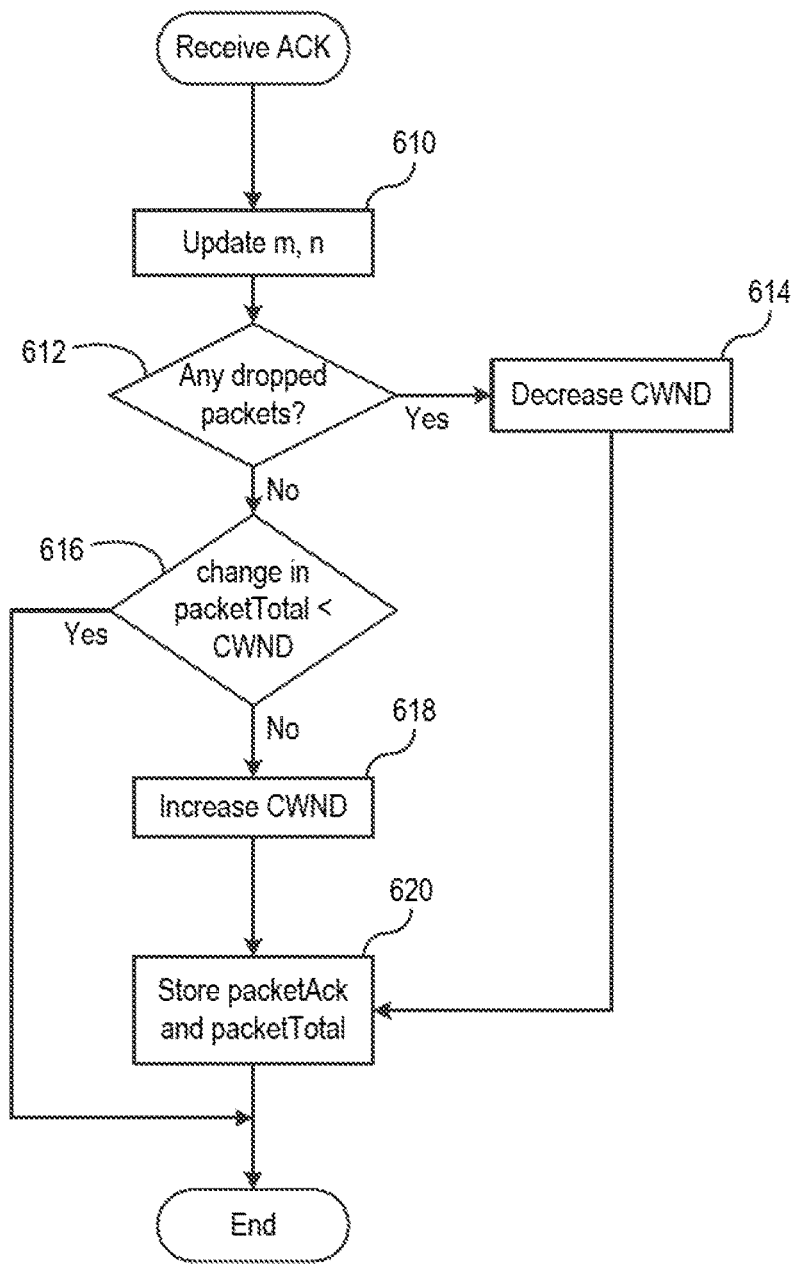
FIG. 6 is a flow diagram of a process carried out by the sender node when receiving an acknowledgement packet from the receiver node.

FIG. 6 is a flow diagram of a process carried out by Rx controller 151 of sender node 11 for adjusting the size of a congestion window, CWND. The process depicted in FIG. 6 is triggered when an ACK packet is received from receiver node 12, where the ACK packet contains values in the following fields: ackSeq, rowCount, packetAck, and packetTotal. At step 610, Rx controller 151 updates the values of m and n in the manner described above in the example of FIGS. 3A and 3B.

At step 612, Rx controller 151 determines whether any packets have been dropped. To determine this, Rx controller 151 compares the number of packets that are expected to have been received by the second node during a certain period (the "expected number") against the total number of packets actually received by the second node during that same period (the "actual number"). In the embodiment, the period for evaluation begins the last time the size of the congestion window was decreased at step 614 or increased at step 618. Accordingly, at step 620, after the size of the congestion window was decreased or increased, Rx controller 151 stores the values of packetAck and packetTotal. The expected number is computed as the increase in packetAck from the stored value and the actual number is computed as the increase in packetAck from the stored value. If the increase in packetAck is greater than the increase in packetTotal, Rx controller 151 determines that one or more packets have been dropped during the evaluation period.

If Rx controller 151 determines packet drop during the evaluation period at step 612, Rx controller 151 at step 614 decreases the size of the congestion window, CWND. Any of the known techniques may be employed in decreasing the size of the congestion window. In one embodiment, the size of the congestion window is taken as one-half of the current congestion window size.

If Rx controller 151 does not determine packet drop at step 612, Rx controller 151 executes the decision block at step 616 to determine whether the total number of all packets, counting both data packets and FEC packets, that have been transmitted since the last evaluation period, namely the change in packetTotal from the stored value, is less than the current congestion window size. If so, the process terminates and is not executed again until the next ACK packet is received from receiver node 12.

On the other hand, if the total number of all packets, counting both data packets and FEC packets, that have been transmitted since the last evaluation period, is not less than the current congestion window size, Rx controller 151 increases the size of the congestion window at step 618. Any of the known techniques may be employed in increasing the size of the congestion window. In one embodiment, the size of the congestion window is increased by one.

As described above, step 620 at which Rx controller 151 stores the values of packetAck and packetTotal to start the next evaluation period, follows both step 614 and step 618. The process terminates after step 620 and is not executed again until the next ACK packet is received from the second node.

Figure 7:
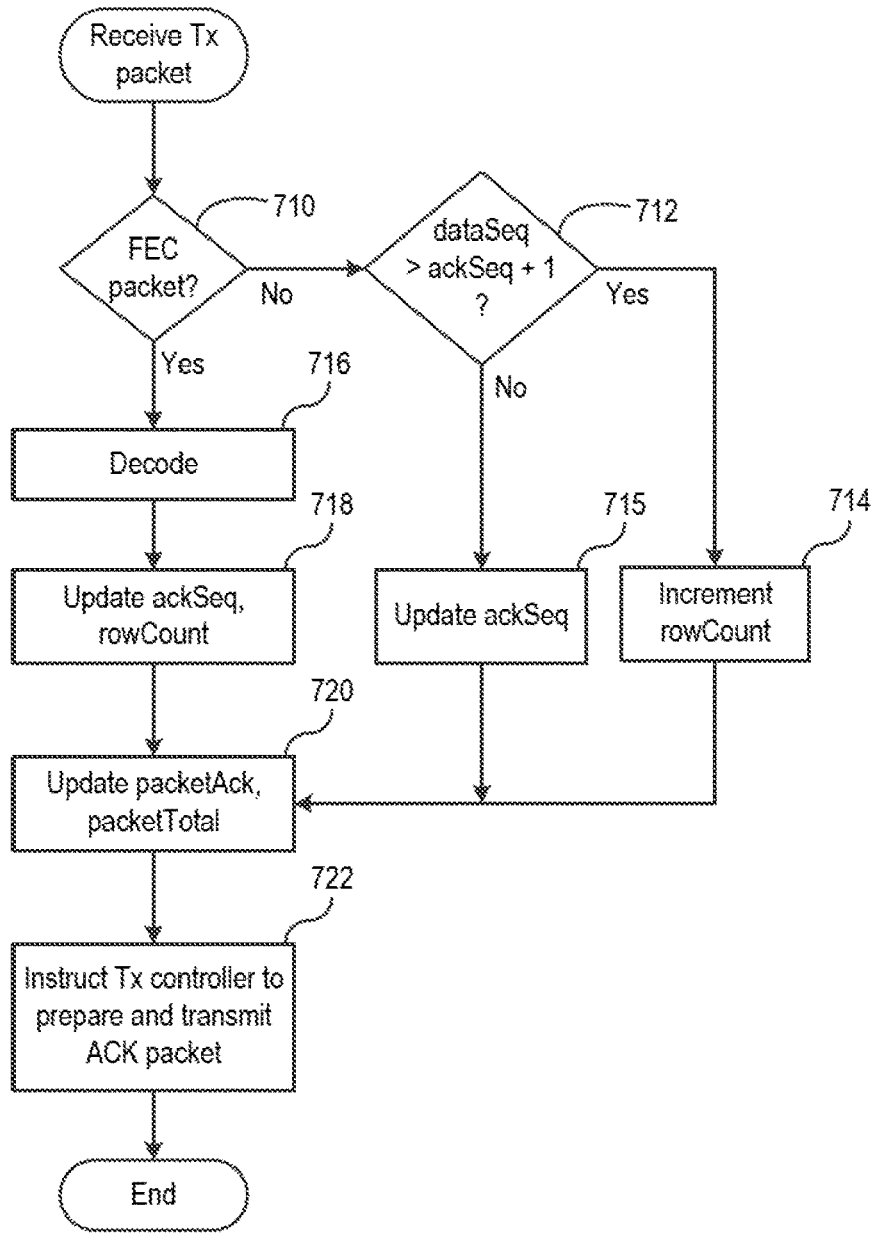
FIG. 7 is a flow diagram of a process carried out the receiver node to decode received data packets and update header fields of an acknowledgement packet to be transmitted to the sender node.

FIG. 7 is a flow diagram of a process carried out by Rx controller 152 of receiver node 12 for decoding received data packets and updating header fields in an ACK packet, which is to be transmitted by Tx controller 142 of receiver node 12 to sender node 11.

The process begins at step 710 with Rx controller 152 evaluating the packet header, in particular the segCount field, to determine whether or not the packet is a data packet or an FEC packet. As described above, a data packet has segCount=1 and an FEC packet has segCount >1.

If the received packet is a data packet, Rx controller 152 determines at step 712 if the received data packet is the next expected data packet by examining the value in the dataSeq field of the received data packet and comparing it against the current ackSeq number, which represents the highest dataSeq number among a contiguous sequence of received data packets.

If the value in the dataSeq field of the received data packet is greater than the current ackSeq number by more than one, this means that the data packet having dataSeq=ackSeq+1 has been dropped, and the received data packet cannot be acknowledged. Thus, at step 714, Rx controller 152 increments rowCount by one and then proceeds to step 720 where Rx controller 152 updates packetAck and packetTotal values in the manner described above in the example of FIG. 4.

If the value in the dataSeq field of the received data packet is not greater than the current ackSeq number by more than one, this means that the received data packet is the next expected data packet. Therefore, Rx controller 152 at step 715 updates the ackSeq value to be equal to the dataSeq value of the received data packet. After step 715, Rx controller 152 proceeds to step 720.

If the received packet is an FEC packet, Rx controller 152 carries out a decoding process using (1) the matrix 440 that is populated with coefficients generated according to techniques described above in the example of FIG. 4 and (2) all received data and FEC packets having a value in the dataSeq field that is greater than the ackSeq value, to reconstruct any dropped packets through, e.g., Gaussian elimination. If there are no dropped packets, Rx controller 152 skips steps 716 and 718 and goes directly to step 720.

At step 722, Rx controller 152 instructs Tx controller 142 to prepare the ACK packet based on the updated values for ackSeq, rowCount, packetAck, and packetTotal, and transmit the ACK packet to sender node 11.

As described above, embodiments provide a unified forward error correction and retransmission technique that can be applied to transport layer protocols so as to improve latency of data transmission between nodes by adapting the technique to network conditions. For example, when there is little congestion in the network to allow transmission of a large number of packets without any being dropped, the size of the congestion window is increased. As the size of the congestion window increases, greater number of data packets will be allowed to be in flight. On the other hand, when there is much congestion in the network such that packets are being dropped, the size of the congestion window is decreased. As the size of the congestion window decreases, less number of data packets will be allowed to be in flight. In addition, the technique allows for dynamically adjusting the number of FEC packets in flight as the probability of packet drop with the network changes and as the number of data packets in flight increases and decreases.

Embodiments described above can be implemented as part of a transport layer protocol used in a virtual desktop infrastructure (VDI) or other Desktop-as-a-Service (DAAS) type of environments, in which a plurality of host computers that host virtual desktops are networked with each other. In such implementations, one of the host computers corresponds to sender node 11 and another one of the host computers correspond to receiver node 12.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of transmitting packets at a first node of a network to a second node of the network, comprising:
   transmitting packets from the first node to the second node;
   determining a total number of packets that are in flight between the first node and the second node;
   determining whether or not the total number of packets that are in flight is less than a threshold number of packets;
   upon determining that the total number of packets that are in flight is less than the threshold number of packets, computing a target number of forward-error-correction (FEC) packets based in part on the total number of packets that are in flight;
   transmitting a new FEC packet if a number of FEC packets that are in flight is less than the target number of FEC packets; and
   transmitting a data packet if the number of FEC packets that are in flight is equal to or greater than the target number of FEC packets.

2. The method of claim 1, further comprising:
   detecting one or more packets that have been dropped; and
   adjusting the threshold number of packets based on a number of dropped packets.

3. The method of claim 2, wherein the threshold number of packets is decreased if a dropped packet is detected and increased if no dropped packet is detected among a contiguous sequence of transmitted packets, where a number of the transmitted packets in the contiguous sequence is equal to the threshold number of packets prior to the adjustment.

4. The method of claim 1, further comprising:
   prior to transmitting the new FEC packet, preparing the new FEC packet based on which of the transmitted packets have been acknowledged as having been received at the second node.

5. The method of claim 4, wherein the new FEC packet includes a header that identifies a first data packet of the transmitted packets, and a count of data packets covered by the new FEC packet.

6. The method of claim 1, wherein the target number of FEC packets is computed based at least in part on a probability of packet loss.

7. The method of claim 5, wherein the header includes a seed for generating random numbers to be used in reconstructing a dropped packet using the new FEC packet.

8. A non-transitory computer readable medium comprising instructions to be executed in a first node of a network to cause the first node to carry out a method of transmitting packets therefrom to a second node of the network, said method comprising:
- transmitting packets from the first node to the second node;
- determining a total number of packets that are in flight between the first node and the second node;
- determining whether or not the total number of packets that are in flight is less than a threshold number of packets;
- upon determining that the total number of packets that are in flight is less than the threshold number of packets, computing a target number of forward-error-correction (FEC) packets based in part on the total number of packets that are in flight;
- transmitting a new FEC packet if a number of FEC packets transmitted that are in flight is less than the target number of FEC packets; and
- transmitting a data packet if the number of FEC packets that are in flight is equal to or greater than the target number of FEC packets.

9. The non-transitory computer readable medium of claim 8, wherein the method further comprises:
- detecting one or more packets that have been dropped; and
- adjusting the threshold number of packets based on a number of dropped packets.

10. The non-transitory computer readable medium of claim 9, wherein the threshold number of packets is decreased if a dropped packet is detected and increased if no dropped packet is detected among a contiguous sequence of transmitted packets, where a number of the transmitted packets in the contiguous sequence is equal to the threshold number of packets prior to the adjustment.

11. The non-transitory computer readable medium of claim 8, wherein the method further comprises:
- prior to transmitting the new FEC packet, preparing the new FEC packet based on which of the transmitted packets have been acknowledged as having been received at the second node.

12. The non-transitory computer readable medium of claim 11, wherein the new FEC packet includes a header that identifies a first data packet of the transmitted packets, and a count of data packets covered by the new FEC packet.

13. The non-transitory computer readable medium of claim 8, wherein the target number of FEC packets is computed based at least in part on a probability of packet loss.

14. The non-transitory computer readable medium of claim 12, wherein the header includes a seed for generating random numbers to be used in reconstructing a dropped packet using the new FEC packet.

15. A computer system including a first node and a second node connected via a network, wherein the first node includes a network interface controller that is configured to:
- transmit packets from the first node to the second node;
- determine a total number of packets that are in flight between the first node and the second node;
- determine whether or not the total number of packets that that are in flight is less than a threshold number of packets;
- upon determining that the total number of packets that are in flight is less than the threshold number of packets, compute a target number of forward-error-correction (FEC) packets based in part on the total number of packets that are in flight;
- transmit a new FEC packet if a number of FEC packets transmitted that are in flight is less than the target number of FEC packets; and
- transmit a data packet if a number of FEC packets transmitted that are in flight is equal to or greater than the target number of FEC packets.

16. The computer system of claim 15, wherein the network interface controller is further configured to:
- detect one or more packets that have been dropped; and
- adjust the threshold number of packets based on a number of dropped packets;
- wherein the threshold number of packets is decreased if a dropped packet is detected and increased if no dropped packet is detected among a contiguous sequence of transmitted packets, where the number of the transmitted packets in the contiguous sequence is equal to the threshold number of packets prior to the adjustment.

17. The computer system of claim 16, wherein the network interface controller is further configured to:
- prior to transmitting the new FEC packet, prepare the new FEC packet based on which of the transmitted packets have been acknowledged as having been received at the second node.

18. The computer system of claim 17, wherein the new FEC packet includes a header that identifies a first data packet of the transmitted packets, and a count of data packets covered by the new FEC packet.

19. The computer system of claim 15, wherein the target number of FEC packets is computed based at least in part on a probability of packet loss.

20. The computer system of claim 18, wherein the header includes a seed for generating random numbers to be used in reconstructing a dropped packet using the new FEC packet.

* * * * *